United States Patent
Boger et al.

(10) Patent No.: US 10,536,974 B2
(45) Date of Patent: Jan. 14, 2020

(54) COORDINATED WIRELESS ACCESS PROTOCOL

(71) Applicant: Apple Inc., Cupertino, CA (US)

(72) Inventors: Yoel Boger, Shoham (IL); Yaniv Dvory, Kfar Saba (IL); Reuven Moskovich, Herzeliya Pituah (IL); Hay Lev, Modi'in (IL)

(73) Assignee: Apple Inc., Cupertino, CA (US)

( * ) Notice: Subject to any disclaimer, the term of this patent is extended or adjusted under 35 U.S.C. 154(b) by 84 days.

(21) Appl. No.: 15/701,248

(22) Filed: Sep. 11, 2017

(65) Prior Publication Data

US 2018/0077726 A1    Mar. 15, 2018

Related U.S. Application Data

(60) Provisional application No. 62/393,289, filed on Sep. 12, 2016.

(51) Int. Cl.
| | | |
|---|---|---|
| *H04W 74/08* | (2009.01) | |
| *H04W 72/04* | (2009.01) | |
| *H04W 84/12* | (2009.01) | |
| *H04W 74/00* | (2009.01) | |

(52) U.S. Cl.
CPC ... *H04W 74/0816* (2013.01); *H04W 72/0446* (2013.01); *H04W 74/006* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2014/0247777 | A1* | 9/2014 | Cariou | H04W 74/0816 |
| | | | | 370/329 |
| 2016/0088513 | A1* | 3/2016 | Huang | H04W 74/0816 |
| | | | | 370/328 |

* cited by examiner

*Primary Examiner* — Ayaz R Sheikh
*Assistant Examiner* — Sori A Aga
(74) *Attorney, Agent, or Firm* — Dickinson Wright LLP

(57) ABSTRACT

An electronic device may coordinate access to a shared communication channel with one or more other electronic devices. After receiving frames from the one or more other electronic devices with information specifying back-off values associated with at least an access category for the one or more other electronic devices in a subsequent potential slot transmission opportunity, the electronic device may update a stored list of known occupied back-off values for the subsequent potential slot transmission opportunity. Then, the electronic device may select and may transmit to the one or more other electronic devices an available back-off value for the electronic device in the subsequent potential slot transmission opportunity that is not included in the stored list and that is associated with an access category. Next, during a slot corresponding to the selected back-off value, the electronic device may transmit a second frame to at least another electronic device.

20 Claims, 7 Drawing Sheets

COORDINATED WIRELESS ACCESS PROTOCOL

CROSS-REFERENCE TO RELATED APPLICATIONS

The present application claims the benefit of U.S. Provisional Patent Application No. 62/393,289, entitled "COORDINATED WIRELESS ACCESS PROTOCOL" filed Sep. 12, 2016, the content of which is incorporated by reference herein in its entirety for all purposes.

FIELD

The described embodiments relate, generally, to wireless communications among electronic devices in a wireless local area network (WLAN), including electronic devices and access points, and techniques for controlling channel access by synchronizing back-off values among the access points and/or the electronic devices in the WLAN.

BACKGROUND

Many wireless local area networks (WLANs), such as those based on a communication protocol that is compatible with an Institute of Electrical and Electronics Engineers (IEEE) 802.11 standard (which is sometimes referred to as 'Wi-Fi'), involve contention-based distributed access systems. In particular, the WLANs are usually contention based because they typically utilize unlicensed frequency bands or spectra, which are unpredictable and are often subject to interference.

For example, Wi-Fi access is often based on carrier sense multiple access (CSMA) with a collision avoidance technique, such as single-user transmission via enhanced distributed channel access (EDCA). EDCA usually involves random access to the shared communication channel or medium by contending electronic devices (which are sometimes referred to as 'stations' or STAs). In particular, as shown in FIG. 1, which presents an existing collision avoidance technique, air access parameters (the arbitration interframe spacing number or AIFSN, the minimum and maximum contention window or CW, etc.) are usually specified by an access point in a WLAN. Moreover, an electronic device in the WLAN is usually only allowed to transmit once a physical channel clear assessment (CCA) and a virtual CCA or carrier-sensing technique (such as the network allocation vector or NAV) are both clear. Typically, the electronic device selects a random back-off value N between 0 and the CW. Furthermore, the back-off time in the electronic device usually expires only when the communication medium is idle for a time duration greater than the AIFS plus N slots. However, if the back-off timers in two electronic devices reach a back-off value of zero concurrently, a transmit collision occurs, and the CW is typically doubled. Therefore, in the event of a transmit collision, both of the electronic devices can be penalized.

Consequently, the reliability of EDCA typically depends on the number of electronic devices contending for the communication medium. In particular, when there are four or more electronic devices concurrently contending to transmit on the communication channels, EDCA usually results in a high rate of collisions (e.g., above 30%). Therefore, Wi-Fi based on EDCA may not suitable for use with medium-bandwidth or high-bandwidth applications (e.g., video streaming, mirroring, gaming, etc.) in dense communication channels.

The unpredictability of the interference with EDCA can make coordination across multiple electronic devices challenging (especially for an unmanaged WLAN), and, as described above, can result in the failure of a collision free period (CFP). In order to address these challenges, contention-free multi-user transmission in uplink has recently been proposed in the IEEE 802.11ax standard. This approach can dramatically change how an electronic device accesses the communication medium. In particular, an electronic device can transmit without contending for the communication medium. Instead, an access point may contend for the communication medium on behalf of the electronic device, and may grant transmission opportunities to the electronic device using a trigger frame (which is sometimes referred to as 'trigger-based access' or 'trigger-based channel access,' e.g., uplink multi-user transmission). During trigger-based uplink channel access, an access point may sense the communication medium and, as needed, perform a back-off procedure on behalf of potential uplink trigger-access-enabled electronic devices. Then, the access point may send a trigger frame with multi-user allocation information to the electronic devices. In response to the trigger frame, the electronic devices may send uplink traffic in the allocated-resource units in a synchronized manner in a multi-user transmission.

In principle, the use of trigger-based access and multi-user transmission can significantly reduce the contention by the electronic devices in the WLAN. Consequently, trigger-based access is often expected to result in improved communication performance.

However, trigger-based access and multi-user transmission is not backwards compatible with existing electronic devices, and may not be suitable for use with point-to-point ad-hoc links, such as Apple Direct Wireless Link or AWDL (from Apple Inc. of Cupertino, Calif.), Neighborhood Area Network (NAN), and/or Wi-Fi Direct.

Alternative approaches to trigger-based access include the use of a dynamic channel selection technique to select a 'quiet' communication channel to avoid collisions. However, the dynamic channel selection technique is typically not an option when there are too few communication channels, such as in the 2.4 GHz frequency band. Moreover, this approach typically adds channel synchronization overhead, which usually consumes bandwidth and increases latency. Furthermore, the dynamic channel selection technique is also not backwards compatible with existing or legacy electronic devices.

SUMMARY

Embodiments relating to an electronic device that coordinates access to a shared communication channel using collision avoidance are described. During operation, an interface circuit in the electronic device may receive, from one or more other electronic devices in a set of electronic devices in a WLAN, one or more frames that include information specifying one or more back-off values associated with at least an access category for the one or more other electronic devices in a subsequent potential slot transmission opportunity. A given frame can include one or more back-off values associated with one or more access categories for a given other electronic device. In response, the interface circuit may update a stored list of known occupied back-off values for the subsequent potential slot transmission opportunity. Moreover, the interface circuit may select an available back-off value for the electronic device in the subsequent potential slot transmission opportunity that is not included in the stored list and that is associated with an access category. Then, the interface circuit may transmit, to the one or more other electronic devices, a frame that includes additional information specifying the selected back-off value. Next, the interface circuit may transmit, during a slot corresponding to the selected back-off value, a second frame to at least one of the one or more other electronic devices.

Note that a collision rate in the WLAN may be generally independent of a number of electronic devices accessing the shared communication channel in the WLAN. In addition, a given one of the electronic device and the one or more other electronic devices may have a uniform access probability to the shared communication channel over a contention window associated with the subsequent potential slot transmission opportunity. Consequently, the throughput and latency may be improved relative to EDCA as the number of electronic devices increases.

Moreover, the back-off value may be randomly selected from available back-off values not included in the stored list.

Furthermore, when a collision occurs between a selected back-off value and an occupied back-off value in the list of known occupied back-off values, the interface circuit may select, for the electronic device, another available back-off value in the subsequent potential slot transmission opportunity that is not included in the stored list and that is associated with an access category.

Additionally, the interface circuit may transmit and receive additional frames from a legacy electronic device that uses EDCA instead of the presently described collision avoidance techniques. Thus, the interface circuit may be compatible with an IEEE 802.11 standard that includes EDCA.

In some embodiments, the interface circuit updates the stored list of known occupied back-off values after each of the frames is received.

Note that the interface circuit may specify use of the collision avoidance technique in a frame control field in the frame that specifies the selected back-off value and/or in the second frame that occupies the slot corresponding to the selected back-off value. In addition, the interface circuit may include the additional information that specifies the selected back-off value in a quality-of-service (QoS) control field in a media access control (MAC) header in the second frame.

Other embodiments provide an interface circuit in the electronic device.

Still other embodiments provide a computer-program product for use with the interface circuit in the electronic device. This computer-program product includes instructions for at least some of the aforementioned operations performed by the interface circuit in the electronic device.

Still other embodiments provide a method for synchronizing back-off values. The method includes at least some of the aforementioned operations performed by the interface circuit in the electronic device.

This Summary is provided for purposes of illustrating some exemplary embodiments, so as to provide a basic understanding of some aspects of the subject matter described herein. Accordingly, it will be appreciated that the above-described features are only examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

The included drawings are for illustrative purposes and serve only to provide examples of possible structures and arrangements for the disclosed systems and techniques for intelligently and efficiently managing communication between multiple associated user devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

Figure 1:
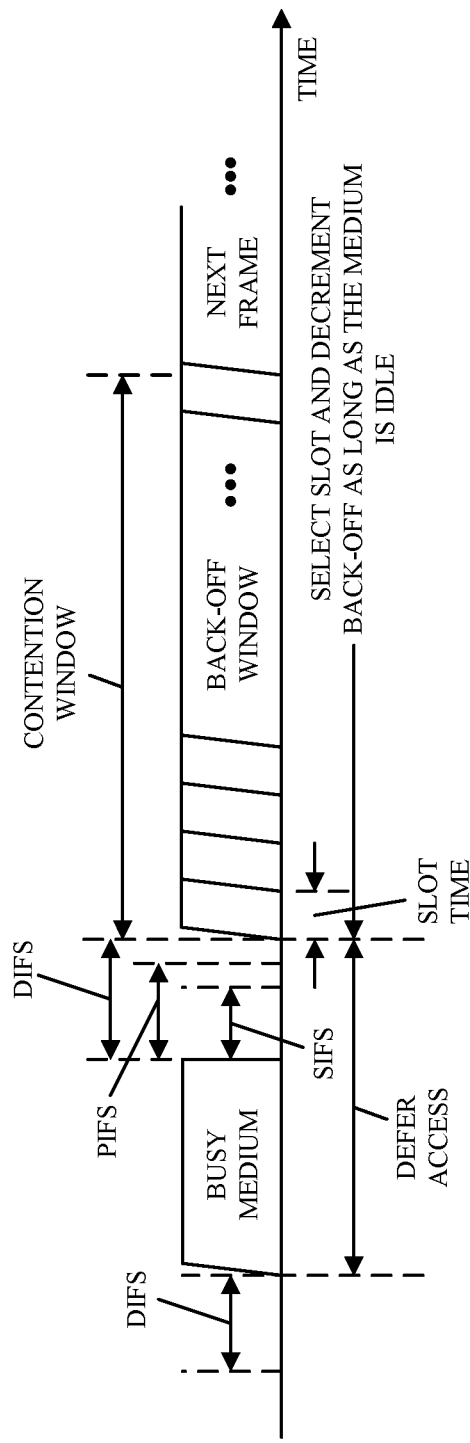
FIG. 1 is a drawing illustrating an existing collision avoidance technique.

Table 1 provides a comparison of an example of the performance of EDCA and a Coordinated Wireless Access Protocol.

Table 2 provides a comparison of an example of the performance of EDCA and a Coordinated Wireless Access Protocol in a mixed environment.

Note that like reference numerals refer to corresponding parts throughout the drawings. Moreover, multiple instances of the same part are designated by a common prefix separated from an instance number by a dash.

DETAILED DESCRIPTION

An electronic device may synchronize access to a shared communication channel with one or more other electronic devices. The electronic device may receive frames from the one or more other electronic devices with information specifying back-off values associated with at least an access category for the one or more other electronic devices, the back-off values corresponding to a subsequent potential slot transmission opportunity. Based on the information, the electronic device may update a stored list of known occupied back-off values for the subsequent potential slot transmission opportunity. Then, the electronic device may select an available back-off value for the electronic device in the subsequent potential slot transmission opportunity that is not included in the stored list and that is associated with an access category. Next, the electronic device may transmit, to the one or more other electronic devices, a frame that includes information specifying the selected back-off value. Furthermore, during a slot corresponding to the selected back-off value, the electronic device may transmit a second frame to at least another electronic device.

By synchronizing the back-off values associated with at least the access category in the subsequent potential slot transmission opportunity, the contention avoidance technique may significantly reduce collisions in a WLAN when the electronic device and the one or more other electronic devices attempt to access a shared communication channel. Consequently, a collision rate in the WLAN that includes the electronic device and the one or more other electronic devices may be generally independent of the number of electronic devices accessing the shared communication channel in the WLAN (i.e., with CWAP there is no longer a strong correlation between collisions and congestion, such that the collision rate is reduced relative to conventional contention avoidance techniques). Moreover, a given one of the electronic device and the one or more other electronic devices may have a uniform access probability to the shared communication channel over a contention window associated with the subsequent potential slot transmission opportunity. Therefore, the throughput and latency (and, more generally, the communication performance) in the WLAN may be improved relative to EDCA as the number of electronic devices increases. In addition, the contention avoidance technique(s) may ensure reduced access overhead, flexibility, and/or may be backwards compatible with existing or legacy electronic devices that do not use the contention avoidance technique(s) (such as legacy electronic devices that use EDCA). In the process, the contention avoidance technique(s) may improve the user experience when using the electronic device, and thus may increase customer satisfaction.

The contention avoidance technique(s) may be used during wireless communication between electronic devices in accordance with a communication protocol, such as an IEEE 802.11 standard (which is sometimes referred to as Wi-Fi). The contention avoidance technique(s) may also be used with a wide variety of other communication protocols, and in access points and electronic devices (such as portable electronic devices or mobile devices) that can incorporate multiple different radio access technologies (RATs) to provide connections through different wireless networks that offer different services and/or capabilities.

An electronic device can include hardware and/or software to support a wireless personal area network (WPAN) according to a WPAN communication protocol, such as those standardized by the Bluetooth® Special Interest Group (in Kirkland, Wash.) and/or those developed by Apple Inc. (in Cupertino, Calif.) that are referred to as AWDL. Moreover, the electronic device can communicate via: a wireless wide area network (WWAN), a wireless metro area network (WMAN) a WLAN, near-field communication (NFC), a cellular-telephone or data network (such as using a third generation (3G) communication protocol, a fourth generation (4G) communication protocol, e.g., Long Term Evolution or LTE, LTE Advanced (LTE-A), a fifth generation (5G) communication protocol, or other present or future developed advanced cellular communication protocol) and/or another communication protocol. In some embodiments, the communication protocol includes a peer-to-peer communication technique.

The electronic device, in some embodiments, can also operate as part of a wireless communication system, which can include a set of client devices, which can also be referred to as stations (STAs), client electronic devices, or client electronic devices, interconnected to an access point, e.g., as part of a WLAN, and/or to each other, e.g., as part of a WPAN and/or an 'ad hoc' wireless network, such as a Wi-Fi direct connection. In some embodiments, the client device can be any electronic device that is capable of communicating via a WLAN technology, e.g., in accordance with a WLAN communication protocol. Furthermore, in some embodiments, the WLAN technology can include a Wi-Fi (or more generically a WLAN) wireless communication subsystem or radio, and the Wi-Fi radio can implement an IEEE 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; IEEE 802.11ax, or other present or future developed IEEE 802.11 technologies.

In some embodiments, the electronic device can act as a communications hub that provides access to a WLAN and/or to a WWAN and, thus, to a wide variety of services that can be supported by various applications executing on the electronic device. Thus, the electronic device may include an 'access point' that communicates wirelessly with other electronic devices (such as using Wi-Fi), and that provides access to another network (such as the Internet) via IEEE 802.3 (which is sometimes referred to as 'Ethernet').

Additionally, it should be understood that the electronic devices described herein may be configured as multi-mode wireless communication devices that are also capable of communicating via, e.g., different 3G and/or second generation (2G) RATs. In these scenarios, a multi-mode electronic device or user equipment (UE) can be configured to prefer attachment to LTE networks offering faster data rate throughput, as compared to other 3G legacy networks offering lower data rate throughputs. For example, in some implementations, a multi-mode electronic device is configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

In accordance with various embodiments described herein, the terms 'wireless communication device,' 'electronic device,' 'mobile device,' 'mobile station,' 'wireless station,' 'wireless access point,' 'station,' 'access point' and 'user equipment' (UE) may be used herein to describe one or more consumer electronic devices that may be capable of performing procedures associated with various embodiments of the disclosure.

Figure 2:
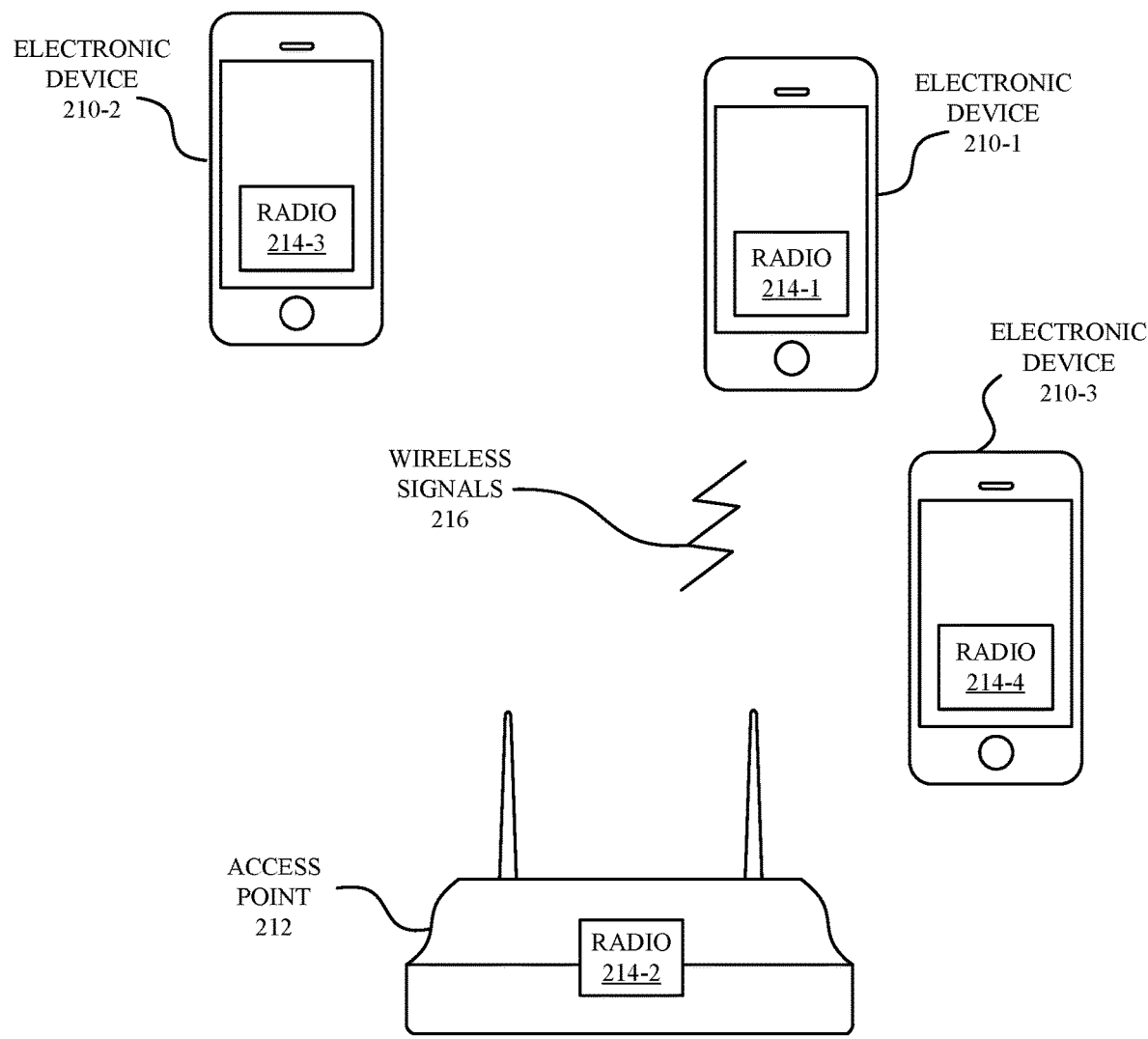
FIG. 2 is a block diagram illustrating an example of electronic devices communicating wirelessly.

We now describe the contention avoidance techniques. FIG. 2 presents a block diagram illustrating an example of electronic devices communicating wirelessly. One or more electronic devices 210 (such as one or more smartphones, laptop computers, notebook computers, tablets, wearable devices, or other such electronic device(s)) and access point 212 may communicate wirelessly in a WLAN using an IEEE 802.11 communication protocol. Thus, electronic devices 210 may be associated with access point 212. For example, electronic devices 210 and access point 212 may wirelessly communicate while: detecting one another by scanning wireless channels, transmitting and receiving beacons or beacon frames on wireless channels, establishing connections (for example, by transmitting connect requests), and/or transmitting and receiving packets or frames (which may include a request and/or additional information, such as data, as payloads). Note that access point 212 may provide access to a network, such as the Internet, (e.g., via an Ethernet protocol) and may be a physical access point or a virtual or 'software' access point that is implemented on a computer or an electronic device.

As described further below with reference to FIG. 7, electronic devices 210 and access point 212 may include subsystems, including any or all of a networking subsystem, a memory subsystem, and a processor subsystem. In addition, electronic devices 210 and access point 212 may include radios 214, e.g., in the networking subsystems. More generally, electronic devices 210 and access point 212 can be implemented as (or can be included within) any electronic devices with networking subsystems that enable electronic devices 210 and access point 212 to wirelessly communicate with one or more other electronic devices. This can include transmitting beacons on wireless channels to enable the electronic devices to make initial contact with or to detect each other, followed by exchanging subsequent data/management frames (such as connect requests) to establish a connection, configure security options (e.g., IPSec), transmit and receive packets or frames via the connection, etc.

As can be seen in FIG. 2, wireless signals 216 are communicated by radios 214-1 and 214-2 in electronic device 210-1 and access point 212, respectively. More generally, one or more of electronic devices 210 and/or access point 212 may exchange frames using a Wi-Fi communication protocol in a WLAN. As described further below with reference to FIGS. 3 and 4, one or more of electronic devices 210 (which are sometimes referred to as a 'set of electronic devices') may transmit one or more frames to other electronic devices 210 and/or access point 212 with information specifying back-off times associated with one or more access categories (such as video, voice, best effort and background data). For example, access point 212, electronic devices 210-2 and/or electronic device 210-3 may broadcast or advertise their back-off values for one or more access categories in a subsequent potential slot transmission opportunity. After receiving frames with the information, electronic device 210-1 may update a stored list of known occupied back-off values for the subsequent potential slot transmission opportunity.

Then, electronic device 210-1 may select an available back-off value for itself in the subsequent potential slot transmission opportunity that is not included in the stored list and that is associated with an access category. Moreover, electronic device 210-1 may transmit, to any/all of access point 212 and electronic devices 210-2 and/or 210-3, a frame that includes additional information specifying the selected back-off value. For example, electronic device 210-1 may broadcast or advertise the additional information.

Next, electronic device 210-1 may transmit, during a slot corresponding to the selected back-off value (which may be the same as or different from the subsequent potential slot transmission opportunity), a second frame to at least one of access point 212, electronic device 210-2, and electronic device 210-3.

By synchronizing the back-off values among access point 212 and any/all of electronic devices 210, this collision avoidance technique may significantly reduce collisions during contention for a shared communication channel in the WLAN. Notably, the collision rate in the WLAN may be generally independent of a number of electronic devices accessing the shared communication channel in the WLAN (e.g., the set of electronic devices). Moreover, using CWAP, a given one of access point 212, electronic device 210-1, electronic devices 210-2 and electronic device 210-3 may have a uniform access probability to the shared communication channel over a contention window associated with the subsequent potential slot transmission opportunity (i.e., CWAP may ensure fairness among electronic devices 210). Therefore, as described below with reference to Tables 1 and 2, the throughput and latency during the communication may be improved relative to EDCA as the number of electronic devices increases.

In addition, the contention avoidance technique may be backwards compatible with existing or legacy electronic devices. Therefore, electronic device 210-1 may be compatible with an IEEE 802.11 standard that includes EDCA. In some embodiments, electronic device 210-1 supports EDCA.

In these ways, the contention avoidance technique may allow electronic devices 210 and access point 212 to reduce contention in the WLAN and to improve communication performance. These capabilities may improve the user experience when using electronic devices, such as electronic devices 210. For example, the contention avoidance technique(s) may improve the performance of medium/high-bandwidth applications (such as video streaming, mirroring, gaming) in dense communication channels or environments.

In the described embodiments, processing a packet or frame in one of electronic devices 210 and access point 212 includes: receiving wireless signals 216 encoding a packet or a frame; decoding/extracting the packet or frame from received wireless signals 216 to acquire the packet or frame; and processing the packet or frame to determine information contained in the packet or frame (such as data in the payload).

In general, communication via the WLAN in the contention avoidance technique may be characterized by a variety of communication-performance metrics. For example, the communication-performance metrics may include any/all of: a received signal strength (RSS), a data rate, a data rate for successful communication (which is sometimes referred to as a 'throughput'), a latency, an error rate (such as a retry or resend rate), a mean-squared error of equalized signals relative to an equalization target, inter-symbol interference, multipath interference, a signal-to-noise ratio (SNR), a width of an eye pattern, a ratio of a number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization').

Although we describe the network environment shown in FIG. 2 as an example, in alternative embodiments, different numbers and/or types of electronic devices may be present. For example, some embodiments may include more, fewer, and/or different electronic devices. As another example, in other embodiments, different electronic devices can be transmitting and/or receiving packets or frames.

Figure 3:
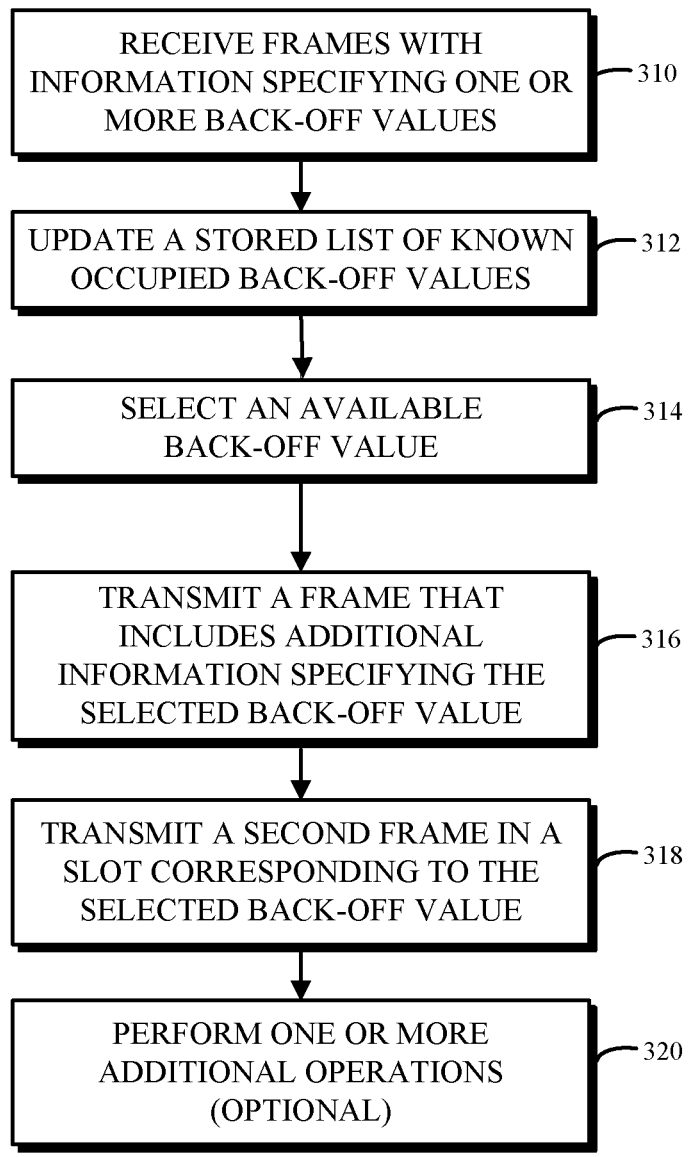
FIG. 3 is a flow diagram illustrating an example of a method for synchronizing one or more back-off values using one of the electronic devices in FIG. 1.

FIG. 3 presents a flow diagram illustrating an example method 300 for coordinating synchronizing back-off values. This method may be performed by an electronic device, such as an interface circuit in access point 212 or one of electronic devices 210 in FIG. 1. During operation, the electronic device may receive, from one or more other electronic devices in a set of electronic devices in a WLAN, one or more frames that include information specifying one or more back-off values (operation 310) associated with at least an access category for the one or more other electronic devices in a subsequent potential slot transmission opportunity. Note that a given frame may include one or more back-off values associated with one or more access categories for a given other electronic device.

In response, the electronic device may generate or update a stored list of known occupied back-off values (operation 312) for the subsequent potential slot transmission opportunity. In some embodiments, the electronic device updates the stored list of known occupied back-off values after each of the frames is received.

Further, the electronic device may select an available back-off value (operation 314) for the electronic device in the subsequent potential slot transmission opportunity that is not included in the stored list and that is associated with an access category. For example, the back-off value may be randomly selected from available back-off values not included in the stored list. In some embodiments, the back-off value is selected using a random number generator that fairly and bounded in time selects a random number from a set of numbers that is not a power of two. Then, the electronic device may transmit, to the one or more other electronic devices, a frame that includes additional information specifying the selected back-off value (operation 316).

Next, the electronic device may transmit, during a slot corresponding to the selected back-off value (which may be the same as or different from the subsequent potential slot transmission opportunity), a second frame (operation 318) to at least one of the one or more other electronic devices.

In some embodiments, the electronic device optionally performs one or more additional operations (operation 320). For example, the electronic device may transmit and receive additional frames from a legacy electronic device that uses EDCA for accessing the wireless medium instead of the presently described collision avoidance technique(s). Thus, the interface circuit may be compatible with an IEEE 802.11 standard that includes EDCA. Additionally, when a collision occurs between a selected back-off value and an occupied back-off value in the list of known occupied back-off values, the interface circuit may select another back-off value for the electronic device in the subsequent potential slot transmission opportunity that is not included in the stored list and that is associated with an access category.

Moreover, there may be additional, fewer, or different operations in method 300. Furthermore, the order of the operations may be changed, and/or two or more operations may be combined into a single operation.

In some embodiments, at least some of the operations in method 300 are performed by an interface circuit in the access point or the electronic device. For example, at least some of the operations may be performed by firmware executed by an interface circuit, such as firmware associated with a MAC layer, as well as one or more circuits in a physical layer in the interface circuit.

Figure 4:
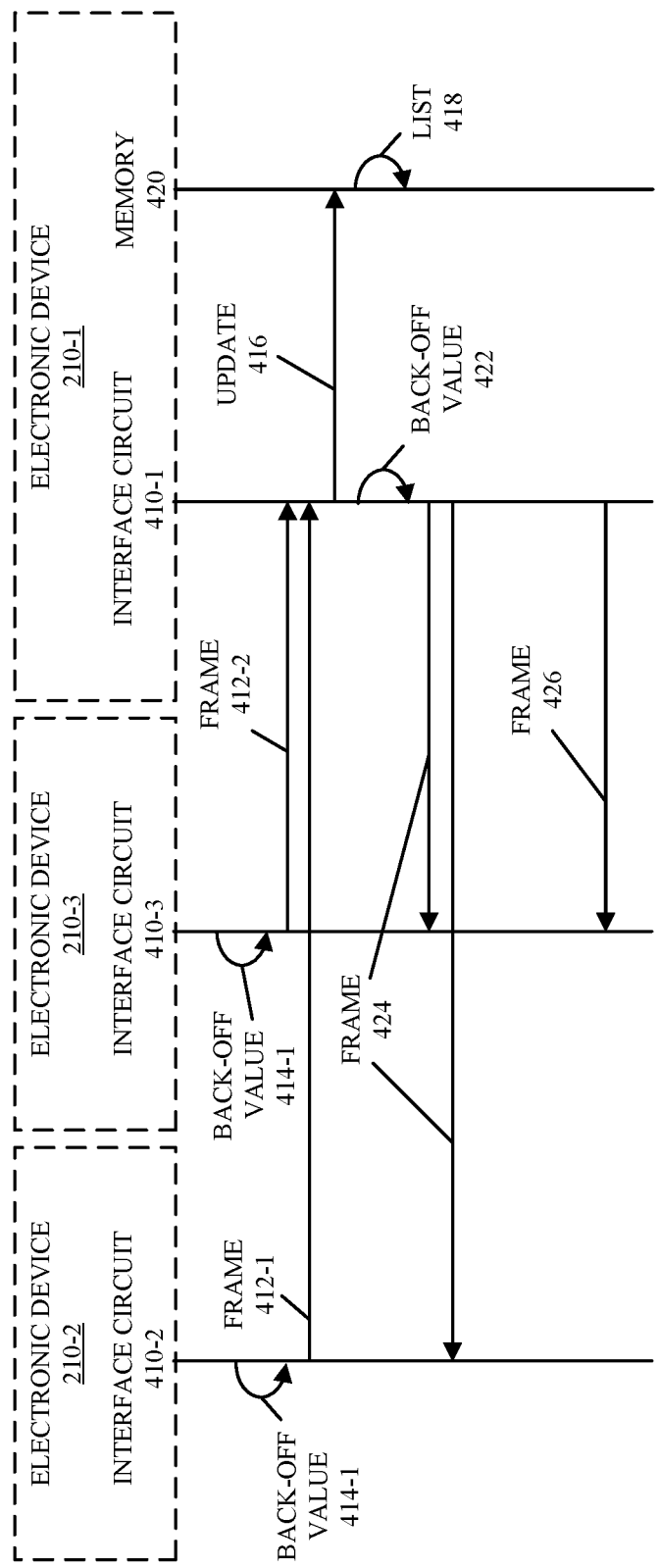
FIG. 4 is a flow diagram illustrating an example of communication between electronic devices, such as electronic devices in FIG. 1.

The contention avoidance technique is further illustrated in FIG. 4, which presents a flow diagram illustrating an example of communication, e.g., between electronic devices 210. Interface circuits 410-2 and 410-3 in electronic devices 210-2 and 210-3 may transmit one or more frames 412 that include information specifying one or more back-off values 414.

After receiving frames 412, interface circuit 410-1 in electronic device 210-1 may update 416 a list 418 of known occupied back-off values in memory 420 (such as a register). Note that memory 420 may separate from or included in interface circuit 410-1.

Moreover, interface circuit 410-1 may select an available back-off value 422 that is not included in the stored list and that is associated with an access category. Then, interface circuit 410-1 may transmit, to the one or more other electronic devices, frame(s) 424 including additional information specifying the selected back-off value 422.

Next, interface circuit 410-1 may transmit, during a slot corresponding to the selected back-off value 422 (which may be the same as or different from the subsequent potential slot transmission opportunity), a frame 426 to at least one of electronic devices 210-2 and 210-3, such as electronic device 210-2.

Representative Embodiments

We now describe contention avoidance technique embodiments. In contention-based channel-access techniques (such as EDCA), each of the electronic devices in the WLAN independently contends for the communication channel. However, as the number of electronic devices in the WLAN increases (and as the congestion increases), the probability of a collision during channel access increases exponentially.

These challenges may be addressed by the proposed contention avoidance technique, which is sometimes referred to as Coordinated Wi-Fi Access Protocol (CWAP). CWAP may be interoperable with legacy networks at legacy performance. Moreover, the channel access opportunity in CWAP may have a uniform distribution, i.e., it may be 'fairly' distributed between the CWAP electronic devices. Consequently, a given CWAP electronic device may be have an equal chance to access the communication channel over the contention window as the other electronic devices.

In congested communication channels, CWAP may significantly improve the channel aggregated throughput and average latency when compared to the legacy Wi-Fi access techniques, such as EDCA. As noted previously, this capability may enable the use of bandwidth/latency sensitive stand-alone or multi-users applications.

CWAP may enhance the legacy Wi-Fi access techniques by synchronizing the communication-channel access of the electronic devices that are contending on the same communication channel, thereby resulting in a reduced collision ratio.

During operation, an electronic device implementing CWAP (which is sometimes referred to as a 'CWAP electronic device') may manage (or maintain) a residual back-off table indicating, per access category, the known occupied back-off values of electronic devices in the WLAN. In some implementations, the residual back-off values in the residual back-off table may be updated in conjunction with the back-off value of the local electronic device (per access category). Moreover, a CWAP electronic device may advertise, through packet transmission, the next back-off count or value to use for this access category. Note that the advertised back-off value may be selected by randomly drawing a back-off value from the non-occupied back-off values (e.g., those back-off values that do not appear in the residual back-off table).

Furthermore, a new occupied back-off value (the advertised value) may be added to the residual back-off table (per access category) after a packet or frame specifying a value is received on the communication channel. Additionally, a local back-off value of the CWAP electronic device may be updated after a frame is received from another CWAP electronic device and/or in the event the local residual back-off value collides with an occupied back-off value as appearing in the residual back off table.

Figure 5:
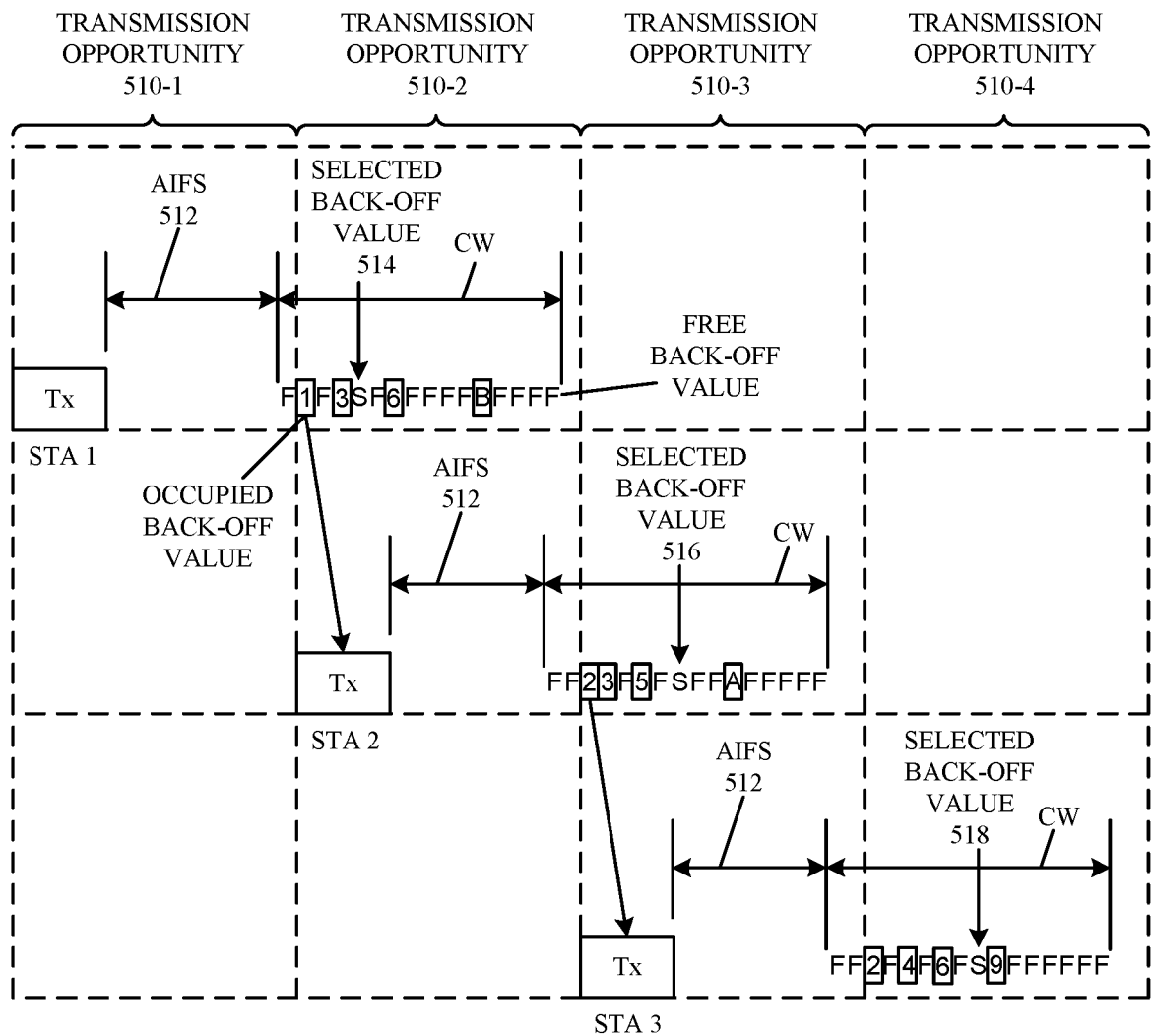
FIG. 5 is a timing diagram illustrating an example of channel access by electronic devices in FIG. 1 in different slots.

FIG. 5 presents an exemplary timing diagram illustrating channel access by the electronic devices of FIG. 1 in different slots. Station (STA) 1 may transmit a frame and receive an acknowledgement during a transmit opportunity 510-1, where transmission of the frame and receipt of the acknowledgement are indicated together by the block labeled Tx for STA 1. After AIFS 512, there may be sixteen possible back-off values. Of these, sixteen back-off values, the particular values 1, 3, 6 and B (or 11 in hexadecimal) may be occupied. STA 1 may select one of the available, free or unoccupied back-off values (denoted by the letter F), where the selected back-off value 514 is denoted by S and has a back-off value of 4.

In the next transmit opportunity 510-2, STA 2 may have the lowest back-off value (such as a back-off value 1). Therefore, STA 2 may transmit a frame and receive an acknowledgment. After AIFS 512, there may be sixteen possible back-off values. Of these, sixteen back-off values, the particular values 2, 3, 5 and A (or 10 in hexadecimal) may be occupied (note that the back-off values decremented when the back-off value for STA 1 was removed from the back-off value table, and thus the previous back-off values of 3, 6, and B became the current back-off values of 2, 5, and A, while the previously selected back-off value of 4 became the current back-off value of 3). STA 2 may select one of the available, free or unoccupied back-off values (F), where the selected back-off value 516 is denoted by S and has the back-off value of 7.

Furthermore, in the following transmit opportunity 510-3, STA 3 may have the lowest back-off value (such as a back-off value 2). Therefore, STA 3 may transmit a frame and receive an acknowledgment. After AIFS 512, there may be sixteen possible back-off values. Of these, sixteen back-off values, the particular values 2, 4, 6 and 9 may be occupied (note that the back-off values decremented by one when the back-off value for STA 2 was removed from the back-off value table, and thus the previous back-off values of 3, 5, and A became the current back-off values of 2, 4 and 9, while the previously selected back-off value of 7 became the current back-off value of 6). STA 3 may select one of the available, free or unoccupied back-off values (F), denoted by S, where the selected back-off value 518 is denoted by S and has the back-off value of 8.

Figure 6:
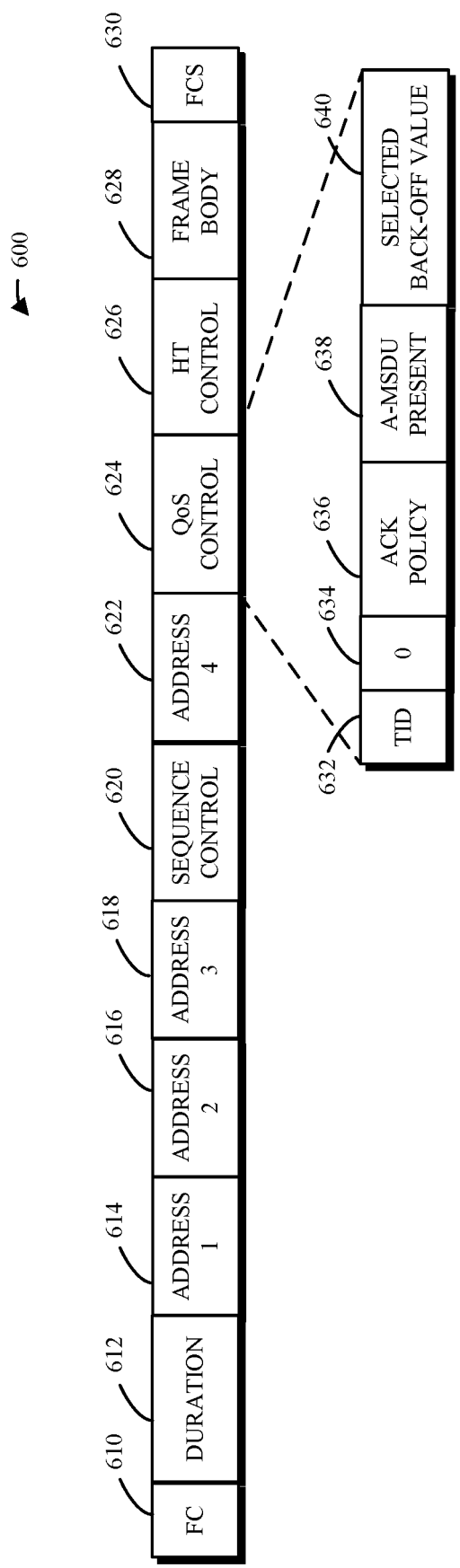
FIG. 6 is a drawing illustrating an example frame for use during communication among at least some of the electronic devices in FIG. 1.

As shown in FIG. 6, which presents a drawing illustrating a frame 600 for use during communication among at least some of the electronic devices illustrated in FIG. 1. This frame may be formatted to include the following fields (or elements): frame control (FC) 610, duration 612, address 1 614, address 2 616, address 3 618, sequence control 620, address 4 622, QoS control 624, high-throughput (HT) control 626, frame body 628, and/or frame check sequence (FCS) 630. Moreover, QoS control 624 may include the following sub-fields (or sub-elements): traffic identifier (TID) 632, a field with a value of '0' 634, an acknowledgment (ACK) policy 636, an indicator of whether an aggregated MAC service data unit is present 638, and/or a selected back-off value 640. Note that CWAP operation may be indicated by setting the protocol version in frame control 610 to a specific value, such as the value '10', (where legacy electronic devices may use the value '00'). Moreover, the selected back-off value 638 may be contained in bits 8-15 of the QoS control field 624 of the MAC header (as the QoS control field 624 is an unused field in the EDCA specification). In other implementations, frame 600 can include different, more, or fewer fields, and the respective sizes of any/all fields can vary. Moreover, one or more values used for a CWAP technique can be implemented using one or more different fields or different bits of a particular field than the example shown.

Table 1 provides a comparison of the performance of EDCA and CWAP with a minimum contention window of 15, N electronic devices, User Datagram Protocol (UDP) transmission, and a maximum UDP throughput at a 54 Mbps physical data rate. The throughput (TP) decreases and the collision rate (CR) increases as the number of electronic devices in the WLAN increases. In contrast, the throughput decreases less and the collision rate is essentially unchanged using CWAP. Moreover, Table 2 provides a comparison of the performance of EDCA and CWAP with N legacy and CWAP electronic devices (e.g., a mixed environment) and a maximum UDP throughput at a 54 Mbps physical data rate. Once again, the CWAP electronic devices have improved throughput relative to the legacy electronic devices.

TABLE 1

| Tx Type | PHY Rate (Mbps) | Number of Streaming Devices | Legacy TP (Total TP) | Legacy CR (%) | Legacy Average Latency (ms) | CWAP TP (Total TP) | CWAP CR (%) | Legacy Average Latency (ms) | ΔTP (%) |
|---|---|---|---|---|---|---|---|---|---|
| UDP | 54 | 1 | 28.4 (28.4) | 0 | <1 | 28.4 (28.4) | 0 | <1 | 0 |
|  |  | 2 | 14.3 (28.5) | 11 | <1 | 15.6 (31.3) | 0 | <1 | 0 |
|  |  | 5 | 5.4 (27.7) | 25 | 1 | 6.6 (33) | 0 | 1 | 14 |
|  |  | 10 | 2.6 (25.9) | 36 | 4 | 3.3 (33.2) | 0 | 3 | 27 |
|  |  | 15 | 1.6 (24.9) | 39 | 6 | 2.2 (33.9) | 0 | 4 | 36 |
|  |  | 20 | 1.2 (24.1) | 43 | 8 | 1.7 (33.5) | 1 | 7 | 39 |
|  |  | 30 | 0.8 (23.1) | 48 | 14 | 1.1 (33.5) | 2.5 | 10 | 45 |
|  |  | 40 | 0.5 (22.6) | 52 | 21 | 0.8 (33.7) | 3 | 13 | 49 |

TABLE 2

| Tx Type | PHY Rate (MbPs) | Number of Legacy Streaming Devices | Number of CWAP Streaming Devices | Legacy TP | CWAP TP | Total TP |
|---|---|---|---|---|---|---|
| UDP | 54 | 4 | 0 | 7.0 | — | 28.0 |
|  |  | 1 | 3 | 3.8 | 8.9 | 30.9 |
|  |  | 0 | 4 | — | 7.8 | 31.1 |
|  |  | 10 | 0 | 2.6 | — | 25.9 |
|  |  | 5 | 5 | 1.6 | 4.4 | 29.0 |
|  |  | 1 | 9 | <0.1 | 3.7 | 33.4 |
|  |  | 0 | 10 | — | 3.3 | 33.2 |

In summary, in some embodiments of the contention avoidance technique(s) described, the electronic devices coordinate their back-off values for a subsequent potential slot transmission opportunity to reduce or eliminate collisions when the electronic devices attempt to access the shared communication channel.

We now describe embodiments of an electronic device. FIG. 7 presents a block diagram of an electronic device 700

(which may be an access point, another electronic device, such as a station or a legacy electronic device) in accordance with some embodiments. This electronic device includes processing subsystem 710, memory subsystem 712, and networking subsystem 714. Processing subsystem 710 includes one or more devices configured to perform computational operations. For example, processing subsystem 710 can include one or more microprocessors, application-specific integrated circuits (ASICs), microcontrollers, programmable-logic devices, and/or one or more digital signal processors (DSPs).

Memory subsystem 712 includes one or more devices for storing data and/or instructions for processing subsystem 710 and networking subsystem 714. For example, memory subsystem 712 can include dynamic random access memory (DRAM), static random access memory (SRAM), a read-only memory (ROM), flash memory, and/or other types of memory. In some embodiments, instructions for processing subsystem 710 in memory subsystem 712 include: one or more program modules or sets of instructions (such as program module 722 or operating system 724), which may be executed by processing subsystem 710. For example, a ROM can store programs, utilities or processes to be executed in a non-volatile manner, and DRAM can provide volatile data storage, and may store instructions related to the operation of electronic device 700. Note that the one or more computer programs may constitute a computer-program mechanism, a computer-readable storage medium or software. Moreover, instructions in the various modules in memory subsystem 712 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 710. In some embodiments, the one or more computer programs are distributed over a network-coupled computer system so that the one or more computer programs are stored and executed in a distributed manner.

In addition, memory subsystem 712 can include mechanisms for controlling access to the memory. In some embodiments, memory subsystem 712 includes a memory hierarchy that comprises one or more caches coupled to a memory in electronic device 700. In some of these embodiments, one or more of the caches is located in processing subsystem 710.

In some embodiments, memory subsystem 712 is coupled to one or more high-capacity mass-storage devices (not shown). For example, memory subsystem 712 can be coupled to a magnetic or optical drive, a solid-state drive, or another type of mass-storage device. In these embodiments, memory subsystem 712 can be used by electronic device 700 as fast-access storage for often-used data, while the mass-storage device is used to store less frequently used data.

Figure 7:
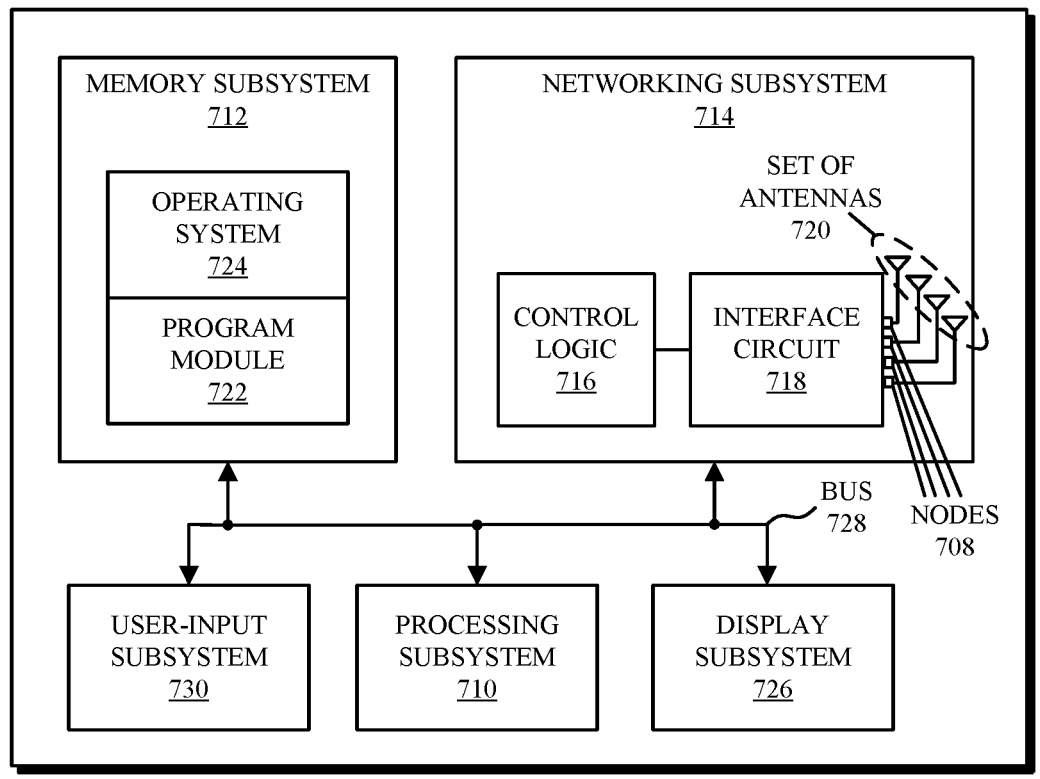
FIG. 7 is a block diagram illustrating an example electronic device, such as one of the electronic devices of FIG. 1.

Networking subsystem 714 includes one or more devices configured to couple to and communicate on a wired and/or wireless network (i.e., to perform network operations), including: control logic 716, an interface circuit 718 and a set of antennas 720 (or antenna elements) in an adaptive array that can be selectively turned on and/or off by control logic 716 to create a variety of optional antenna patterns or 'beam patterns.' (While FIG. 7 includes set of antennas 720, in some embodiments electronic device 700 includes one or more nodes, such as nodes 708, e.g., a pad, which can be coupled to set of antennas 720. Thus, electronic device 700 may or may not include set of antennas 720.) For example, networking subsystem 714 can include a Bluetooth™ networking system, a cellular networking system (e.g., a 3G/4G/5G network such as UMTS, LTE, etc.), a universal serial bus (USB) networking system, a networking system based on the standards described in IEEE 802.11 (e.g., a Wi-Fi® networking system), an Ethernet networking system, and/or another networking system.

Networking subsystem 714 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 700 may use the mechanisms in networking subsystem 714 for performing simple wireless communication between the electronic devices, e.g., transmitting advertising or beacon frames and/or scanning for advertising frames transmitted by other electronic devices.

Within electronic device 700, processing subsystem 710, memory subsystem 712, and networking subsystem 714 are coupled together using bus 728 that facilitates data transfer between these components. Bus 728 may include an electrical, optical, and/or electro-optical connection that the subsystems can use to communicate commands and data among one another. Although only one bus 728 is shown for clarity, different embodiments can include a different number or configuration of electrical, optical, and/or electro-optical connections among the subsystems.

In some embodiments, electronic device 700 includes a display subsystem 726 for displaying information on a display, which may include a display driver and the display, such as a liquid-crystal display, a multi-touch touchscreen, etc. Display subsystem 726 may be controlled by processing subsystem 710 to display information to a user (e.g., information relating to incoming, outgoing, or an active communication session).

Electronic device 700 can also include a user-input subsystem 730 that allows a user of the electronic device 700 to interact with electronic device 700. For example, user-input subsystem 730 can take a variety of forms, such as: a button, keypad, dial, touch screen, audio input interface, visual/image capture input interface, input in the form of sensor data, etc.

Electronic device 700 can be (or can be included in) any electronic device with at least one network interface. For example, electronic device 700 may include: a cellular telephone or a smartphone, a tablet computer, a laptop computer, a notebook computer, a personal or desktop computer, a netbook computer, a media player device, an electronic book device, a MiFi® device, a smartwatch, a wearable computing device, a portable computing device, a consumer-electronic device, an access point, a router, a switch, communication equipment, test equipment, as well as any other type of electronic computing device having wireless communication capability that can include communication via one or more wireless communication protocols.

Although specific components are used to describe electronic device 700, in alternative embodiments, different components and/or subsystems may be present in electronic device 700. For example, electronic device 700 may include one or more additional processing subsystems, memory subsystems, networking subsystems, and/or display subsystems. Additionally, one or more of the subsystems may not be present in electronic device 700. Moreover, in some embodiments, electronic device 700 may include one or more additional subsystems that are not shown in FIG. 7. Also, although separate subsystems are shown in FIG. 7, in some embodiments some or all of a given subsystem or component can be integrated into one or more of the other subsystems or component(s) in electronic device 700. For example, in some embodiments program module 722 is included in operating system 724 and/or control logic 716 is included in interface circuit 718.

Moreover, the circuits and components in electronic device 700 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 714. This integrated circuit may include hardware and/or software mechanisms that are used for transmitting wireless signals from electronic device 700 and receiving signals at electronic device 700 from other electronic devices. Aside from the mechanisms herein described, radios are generally known in the art and hence are not described in detail. In general, networking subsystem 714 and/or the integrated circuit can include any number of radios. Note that the radios in multiple-radio embodiments function in a similar way to the described single-radio embodiments.

In some embodiments, networking subsystem 714 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF). Those of skill in the art of integrated circuit design can develop such data structures from schematic diagrams of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used a Wi-Fi communication protocol as an illustrative example, in other embodiments a wide variety of communication protocols and, more generally, wireless contention avoidance techniques may be used. Thus, the contention avoidance technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the contention avoidance technique may be implemented using program module 722, operating system 724 (such as a driver for interface circuit 718) or in firmware in interface circuit 718. Alternatively or additionally, at least some of the operations in the contention avoidance technique may be implemented in a physical layer, such as hardware in interface circuit 718. In some embodiments, the contention avoidance technique is implemented, at least in part, in a MAC layer and/or in a physical layer in interface circuit 718.

Furthermore, in general, the contention avoidance technique may be used to facilitate scheduled channel access in time and/or frequency in conjunction with multi-user multiple input multiple output (MU-MIMO) and/or orthogonal frequency division multiple access (OFDMA).

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
one or more nodes configured to communicatively couple to an antenna; and
an interface circuit, communicatively coupled to the one or more nodes, configured to communicate with a set of electronic devices in a wireless local area network (WLAN), and configured to:
receive, from another electronic device of the set of electronic devices, a first frame comprising first information specifying a back-off value for the another electronic device in a subsequent potential slot transmission opportunity;
update, in response to the first information, a stored list of known occupied back-off values for the subsequent potential slot transmission opportunity;
select an available back-off value for the electronic device in the subsequent potential slot transmission opportunity that is not included in the stored list; and transmit, to the another electronic device, during a slot corresponding to the selected back-off value, a second frame comprising second information specifying the selected back-off value.

2. The electronic device of claim 1, wherein a collision rate in the WLAN is reduced relative to enhanced distributed channel access (EDCA) as a number of electronic devices accessing a shared communication channel in the WLAN increases.

3. The electronic device of claim 2, wherein throughput and latency associated with communication with one or more of the set of electronic devices is improved relative to EDCA as a number of electronic devices in the WLAN increases.

4. The electronic device of claim 1, wherein one of the electronic device and the another electronic device has a uniform access probability to a shared communication channel over a contention window associated with the subsequent potential slot transmission opportunity.

5. The electronic device of claim 1, wherein the interface circuit is configured to randomly select the available back-off value from available back-off values not included in the stored list.

6. The electronic device of claim 1, wherein, when a collision occurs between the selected back-off value and an occupied back-off value in the list of known occupied back-off values, the interface circuit is further configured to select another available back-off value for the electronic device in the subsequent potential slot transmission opportunity that is not included in the stored list and that is associated with an access category.

7. The electronic device of claim 1, wherein the interface circuit is compatible with an IEEE 802.11 standard that includes enhanced distributed channel access (EDCA).

8. The electronic device of claim 1, wherein the interface circuit is configured to update the stored list of known occupied back-off values after each frame is received.

9. The electronic device of claim 1, wherein the interface circuit is configured to specify an ability to synchronize back-off values in a frame control field in the first frame and/or the second frame.

10. The electronic device of claim 1, wherein the interface circuit is configured to include the second information specifying the selected back-off value in a quality-of-service (QoS) control field in a media access control (MAC) header in the second frame.

11. A non-transitory computer-readable storage medium storing instructions that, when executed by an interface circuit included in an electronic device, cause the electronic device to synchronize one or more back-off values, by carrying out one or more operations that comprise:
receiving, from another electronic device of a set of electronic devices in a wireless local area network (WLAN), one or more first frames each comprising first information specifying a back-off value associated with at least an access category for the another electronic device in a subsequent potential slot transmission opportunity;
updating, in response to the first information, a stored list of known occupied back-off values for the subsequent potential slot transmission opportunity after each of the one or more first frames is received;
selecting an available back-off value for the electronic device in the subsequent potential slot transmission opportunity that is not included in the stored list and that is associated with an access category; and
transmitting, to the another electronic device, during a slot corresponding to the selected back-off value, a second frame comprising second information specifying the selected back-off value.

12. The non-transitory computer-readable storage medium of claim 11, wherein a collision rate in the WLAN is approximately independent of a number of electronic devices accessing a shared communication channel in the WLAN.

13. The non-transitory computer-readable storage medium of claim 12, wherein throughput and latency associated with communication with one or more of the set of electronic devices is improved relative to enhanced distributed channel access (EDCA) as a number of electronic devices in the WLAN increases.

14. The non-transitory computer-readable storage medium of claim 11, wherein the selecting the available back-off value comprises randomly selecting the available back-off value from available back-off values not included in the stored list.

15. The non-transitory computer-readable storage medium of claim 11, wherein the interface circuit is compatible with an IEEE 802.11 standard that includes enhanced distributed channel access (EDCA).

16. A method of coordinating a plurality of back-off values, comprising:
in an interface circuit in an electronic device:
receiving, from another electronic device of a set of electronic devices in a wireless local area network (WLAN), a first frame comprising first information specifying a back-off value associated with at least an access category for the another electronic device in a subsequent potential slot transmission opportunity;
updating, in response to the first information, a stored list of known occupied back-off values for the subsequent potential slot transmission opportunity;
selecting an available back-off value for the electronic device in the subsequent potential slot transmission opportunity that is not included in the stored list and that is associated with an access category; and
transmitting, to the another electronic device, during a slot corresponding to the selected back-off value, a second frame comprising second information specifying the selected back-off value.

17. The method of claim 16, wherein a collision rate in the WLAN is approximately independent of a number of electronic devices accessing a shared communication channel in the WLAN.

18. The method of claim 17, wherein throughput and latency associated with communication with one or more of the set of electronic devices is improved relative to enhanced distributed channel access (EDCA) as a number of electronic devices in the WLAN increases.

19. The method of claim 16, wherein the transmitting the second frame comprises including the second information specifying the selected back-off value within a quality-of-service (QoS) control field in a media access control (MAC) header in the second frame.

20. The method of claim 16, wherein the interface circuit is compatible with an IEEE 802.11 standard that includes enhanced distributed channel access (EDCA).

* * * * *